United States Patent Office 3,698,930
Patented Oct. 17, 1972

3,698,930
PROCESS FOR THE PREPARATION OF IRIDESCENT FILMS AND FILAMENTS AND THE PRODUCT SO PRODUCED
Yves Fleurquin, Oullins, and Andre Bruckmann, Tassin la Demi Lune, France, assignors to La Cellophane, Paris, France
No Drawing. Filed Nov. 18, 1968, Ser. No. 776,802
Claims priority, application France, Dec. 28, 1967, 134,042
Int. Cl. B44f 1/14; B44d 1/16
U.S. Cl. 117—45    11 Claims

ABSTRACT OF THE DISCLOSURE

A process for making iridescent films and filaments which comprises depositing on a flexible support a thin metallic layer, coating the metallized face thereof with a transparent varnish which adheres strongly thereto, drying said varnish, and depositing on the varnished face an extremely thin second metallic layer so that said second metallic layer is almost transparent to normally incident light rays while it reflects light inclined at a large angle and the products produced by said process.

---

The instant invention is directed to a process for making iridiescent films and filaments and the products so produced.

It is known in the art that one can coat supports such as films or strips of various plastic materials with a thin metal coating by means of in vacuo coating. In addition, it is also known that one may prepare metallized films which are coated with a varnished material on the metalized base thereof subsequent to the coating step. Films of this type have been prepared with base materials, i.e., films or strips of various synthetic resins such as polyethylene teraphthalate. Subsequent to the metallization of the film surface the treated and coated films may be cut or slit lengthwise into narrow strips which are thereafter converted into filaments and may be subsequently woven into fabrics. The films or strips so produced are of somewhat limited use, however, inasmuch as the coating thereof shows a uniform metallized effect devoid of variation.

Numerous attempts have been made to modify this uniform metallized appearance which attempts include the application of colored prints on the varnished face of the metallized films so as to produce various colored effects. This process has a major disadvantage, however, in that these prints are produced by means of inks which are either opaque or only partially transparent and for this reason the metallized surface is to some extent masked and the greater portion of the abstract effect produced by the metallization of the support film or strip is removed.

Therefore, it is an object of the instant invention to prepare metallized films which have a novel and varying iridescent appearance.

Another object of the instant invention is to prepare novel metallized iridescent films and filaments by applying to the surface of a film or filament support a multiplicity of metallic layers which have varying thicknesses.

These and other objects of the instant invention will become more evident in the following more detailed description thereof.

In general, the process of the instant invention comprises depositing on a flexible support a thin metallic layer. Subsequent thereto, a layer of transparent film which layer has strong adhesive properties for the metallic layer is coated on the metallic face of the flexible support material. This transparent varnished layer is then dried and a second extremely thin metallic layer is applied thereto. This second metallic layer is of such a character that it is practically transparent to normally incident light rays while at the same time it reflects light rays which are inclined at a large angle. In general, the first metallized layer may be deposited by any known physical, chemical, or other means. It is preferred, however, that this coating be by deposition in vacuo. The thickness of this layer is that which is conventionally obtained by such in vacuo deposition. Thus, a layer of from about 0.04 to about 0.07 micron thick is usually obtained and is suitable for use in the instant invention when one applies the metal coating by metallization in vacuo. It is noted, however, that this layer may be either thicker than the above-noted parameters since its essential purpose in the metallized fiber is to reflect light. The ultimate thickness is dictated also to some extent by the degree of flexibility that one desires the end product to have. With regard to the second metal layer, said second layer should be extremely thin so that it is practically transparent to normally incident light rays and will reflect light inclined at a large angle. The second layer should thus be as thin as possible and preferably less than 0.02 micron. It is possible using currently known techniques of metallization in vacuo to deposit such layers and to even obtain thinner layers. Layers as thin as 0.003 micron have been obtained and are perfectly suitable in connection with the instant invention. Therefore, one may use a first metallized layer having a thickness from about 0.04 to about 0.07 micron thick and a second metal layer having a thickness from about 0.003 micron to about 0.02 micron thick. The metallization may be performed by any known process including in vacuo, chemical, or other physical processes which are currently known.

The instant invention and the coatings employed therein may comprise any conventional metallic coating material such as chromium, bismith, tin, magnesium, nickel, silver, gold, zinc and aluminum. Of all these metals, however, aluminum is generally preferred inasmuch as the deposition of aluminum results in the product of a lightweight metallized fabric which has exceptional brilliance. Furthermore, the first or primary metal layer may also consist of a different metal than that which is employed in the second or secondary surface layer of metal. That is to say that one may first apply a metal coating of nickel which is used as the first metal coating which is subsequently varnished and then apply the second metal coating of aluminum. It is noted, however, that in general the same metallic material is used for both layers of coating.

Through the process of the instant invention it is possible to obtain, without the use of dyestuffs, metallized films or filaments which when observed exhibit colored effects in which the silver gilded or other metallized appearance is neither masked nor reduced. Furthermore, the films and strips obtained by the instant invention show an iridescent effect which causes their colored reflections to vary in an unexpected and continuous manner. This iridescent effect is due to the presence of the two metallized layers and the presence of the intermediate transparent varnish layer across which the light rays are diffracted.

In this regard it is noted that the thickness of the varnish layer effects to some extent the nature of the iridescent shades, so that it is quite possible by empirical method to control these shades by controlling the thickness of said varnish layer. Furthermore, it is noted that said varnish layer may be of uniform thickness but for the above-noted reasons and other reasons it is preferred to vary the thickness of the said varnish layer so as to increase the iridescent effects produced thereby. In this regard said varnish layer may be applied in either an irregular or regular pattern with varying thicknesses therein. It is also noted that iridescent effects may be varied by controlling the application of the second metallized layer. That is to say that if one interrupts said application, one can obtain numerous interesting iridescent effects.

With regard to the varnish layer any conventional varnish material may be employed. Thus, for example, the varnish material may comprise a suitable varnish having a cross-linkable base, e.g., a base of acrylic acid, methacrylic acid, or esters thereof, a nitrocellulose base, a polymerized vinyl chloride base, polymerized vinylidene chloride base, and mixtures and copolymers of the same. The varnish employed can be either transparent, colored, or colorless, according to the particular iridescent effect one desires to produce. It is noted, however, that said varnished material should adhere strongly to the metallized layer without changing its chemical nature. In connection with the preferred metallized layer, i.e., aluminum, varnishes containing acid groups are preferably employed inasmuch as said varnishes containing acid groups adhere well to said aluminum layers. In this regard conventional varnishes containing nitrocellulose or varnishes consisting of copolymers of vinyl acetate, vinyl chloride, or maleic acid may be employed. Such varnishes are generally dissolved in organic solvent, e.g., a conventional ketonic solvent such as methyl ethyl, ketone, methyl isobutyl ketone, etc. to which a plasticizing additive, e.g., ethyl acetate has been added. Of course, all of the above exemplified varnish bases that can be employed in accordance with the present invention are only exemplary of the various and sundry varnishes which can be employed in accordance with the process disclosed herein. The only essential characteristics are that said varnish adheres strongly to the metallized layers without changing their nature. As noted, one can also employ conventional colored varnishes which in addition to the above ingredients incorporate various pigments, for example, gilding, so as to empirically vary the ultimate product.

The varnish may be deposited by any conventional coating process and may be applied either as emulsions, aqueous solutions, or solutions in organic solvents. They may thereafter, if necessary and appropriate, be subjected to a cross-linking treatment by passing the coated film through an oven or round heated drums. In addition, variations in thicknesses of the varnish may be obtained by various conventional means including passing the metallized support material over wet varnish cylinders which are engraved to varying depths, and/or by imparting to the strip which is metallized an irregular forward movement relative to an engraved cylinder.

The average thickness of the varnish layer applied may vary quite widely and is dependent on the desired effect one wishes to obtain in the end product. In addition to being dependent upon the thickness of the varnish, the end effect also depends upon the refractive index of the product employed. In practice, however, the thickness may generally vary from about 0.4 gram to about 2 grams per square meter of support. These variations can be obtained by varying the concentration of the varnish solution.

The process of the instant invention may be used in connection with all types of supports such as, for example, cellulosic films, plastic films, of any flexible, transparent or opaque material which is suitable for metallization. For example, the process of the instant invention may be employed in connection with, but is not limited to, such films as regenerated cellulose, cellulose derivatives, e.g., cellulose acetate or cellulose butyrate, synthetic plastic materials, e.g., polyvinyl chloride, polyamides, polyvinylidene chloride, polyvinyl acetate, polyvinylpyrrolidone, polyether and polyester-based polyurethanes, and even synthetic and natural rubbers or papers which have been impregnated with plastic materials. Furthermore, the instant invention may be applied to plastic films which have been previously applied by coating or extrusion to another desired support fabric such as woven fabrics. Preferred materials employed as supports in connection with the instant invention include polyester resins which have combined properties of strength and flexibility as films. The preferred polyester film is a polyethylene glycol terephthalate film which has both of the above-noted properties, i.e., strength and flexibility and is particularly suitable for the instant invention and in addition may be employed in obtaining iridescent filaments by longitudinal splitting of a wide support strip.

In the fabrication of filaments it is generally sufficient to treat one surface of the support. It has not been found to be necessary to metallize and varnish the opposite face of the support material when said support material is designed for use in the preparation of filaments. When, however, the product of the instant invention is intended for other uses, as for example, in the preparation of packaging films, the process that may be applied to both faces of the support either in an identical manner or in a divergent manner with variations therein which may relate to the nature of the metallic layers, the average thickness of the varnish layer, or to the use of thickness variations corresponding to different patterns on the opposite faces.

In accordance with the process of the instant invention as previously noted the metallization may be accomplished by chemical, physical or other coating means. The preferred coating means is metallization in vacuo which can generally be accomplished by sputtering the metallic film onto the surface of the plastic support by any of the known techniques of metallizing films of plastic materials. Such conventional techniques as metallizing plastic films are well known in the art and are incorporated herein by reference. It is pointed out in this respect that the present invention is not predicated upon a particular manner of producing the metallic layer or coating, but rather is predicated upon the use of a plurality of coatings with an intervening varnish layer which results in an iridescent end product.

The present invention will now be illustrated by reference of the following specific examples. It is to be understood that such examples are presented for the purposes of illustration only and that the present invention is in no way to be deemed as limited thereto.

EXAMPLE 1

A polyethylene terephthalate film was metallized under vacuum with aluminum so as to deposit thereon a layer of aluminum having a thickness of 0.05 micron thick. The polyethylene terephthalate was then coated by means of a coating apparatus with a varnish containing copolymers of vinyl acetate, vinyl chloride and maleic acid so as to apply to the metallized film a thickness of approximately 1 gram per square meter. The surface was then dried and subsequently metallized under vacuum with aluminum so as to apply to the varnished surface a layer of aluminum having a thickness of 0.003 micron. The product which resulted is found to display iridescent effects.

EXAMPLE 2

Example 1 was repeated with the exception that the second metal layer was applied in a locally interrupted pattern which resulted in the end product having a modified iridescent effect which was considered to be as desirable as that of the product of Example 1.

We claim:

1. Iridescent film consisting essentially of a synthetic resin support, a first metallic layer of aluminum on said support, a transparent varnish layer on the entire face of said first metallic layer and a second metallic layer of aluminum on the face of said varnish layer, said second metallic layer having a thickness of from about 0.003 to 0.02 micron.

2. The article of claim 1 wherein said first metallic layer has a thickness of from about 0.04 to 0.07 micron.

3. The article of claim 1 wherein said varnished layer comprises copolymers of vinyl acetate, vinyl chloride, and maleic acid.

4. The article of claim 1 wherein said support is polyethylene terephthalate.

5. The article of claim 1 wherein said varnish layer is non-uniform in thickness.

6. A process for making iridescent films consisting essentially of permanently depositing a first metallic layer of aluminum on a synthetic resin support, varnishing the face of said metallic layer with a transparent varnish and coating said varnished surface when dried with a second metallic layer of aluminum, said second metallic layer having a thickness of from about 0.003 micron to about 0.02 micron.

7. The process of claim 1 wherein the first metallic layer has a thickness of from about 0.04 to 0.07 micron.

8. The process of claim 6 wherein said first and second metallic coatings are produced by metallization in vacuo.

9. The process of claim 6 wherein said varnished layer comprises copolymers of vinyl acetate, vinyl chloride, and maleic acid.

10. The process of claim 6 wherein said support is polyethylene terephthalate.

11. The process of claim 6 wherein said varnish layer is applied non-uniformly over the entire surface of said first metallic layer so as to vary the thickness of the resulting layer.

References Cited

UNITED STATES PATENTS

| | | | |
|---|---|---|---|
| 2,754,230 | 7/1956 | McLean et al. | 117—71 RX |
| 2,923,651 | 2/1960 | Petriello | 117—71 RX |
| 2,974,055 | 3/1961 | Scharf | 117—72 X |
| 2,992,125 | 7/1961 | Fustier | 117—71 X |
| 2,993,806 | 7/1961 | Fisher et al. | 117—107 X |
| 3,288,626 | 11/1966 | Delacoux | 117—71 X |

RALPH S. KENDALL, Primary Examiner

C. K. WEIFFENBACH, Assistant Examiner

U.S. Cl. X.R.

117—71 R, 76 R, 76 F, 107